(12) United States Patent
Parnin et al.

(10) Patent No.: US 11,668,247 B2
(45) Date of Patent: Jun. 6, 2023

(54) GEARED GAS TURBINE WITH OIL SCAVENGE EJECTOR PUMP ASSIST

(71) Applicant: Raytheon Technologies Corporation, Farmington, CT (US)

(72) Inventors: Francis Parnin, Suffield, CT (US); Vaidyanathan Sankaran, Ellington, CT (US)

(73) Assignee: Raytheon Technologies Corporation, Farmington, CT (US)

( * ) Notice: Subject to any disclaimer, the term of this patent is extended or adjusted under 35 U.S.C. 154(b) by 0 days.

(21) Appl. No.: 17/232,251

(22) Filed: Apr. 16, 2021

(65) Prior Publication Data
US 2022/0333532 A1 Oct. 20, 2022

(51) Int. Cl.
*F02C 7/36* (2006.01)
*F02C 7/06* (2006.01)

(52) U.S. Cl.
CPC ............... *F02C 7/36* (2013.01); *F02C 7/06* (2013.01); *F05D 2220/32* (2013.01)

(58) Field of Classification Search
CPC ............... F02C 7/06; F16H 57/0482; F16H 57/042–0479; F16H 57/0408
See application file for complete search history.

(56) References Cited

U.S. PATENT DOCUMENTS

| | | | | |
|---|---|---|---|---|
| 2,571,166 | A | * | 10/1951 | Rossetto ............... F01D 25/18 184/6.11 |
| 3,147,913 | A | * | 9/1964 | Omri ............... F01D 25/18 415/176 |
| 4,153,141 | A | | 5/1979 | Methlie |
| 4,787,271 | A | * | 11/1988 | Brogdon ............... F16H 3/54 184/6.12 |
| 5,494,355 | A | * | 2/1996 | Haase ............... F16N 31/00 384/135 |
| 6,237,322 | B1 | | 5/2001 | Rago |

(Continued)

FOREIGN PATENT DOCUMENTS

DE 102006023580 A1 * 11/2007 ............. F01D 15/00
WO 2014/200587 A2 12/2014

OTHER PUBLICATIONS

European Search Report for EP Application No. 22168587.8 dated Sep. 12, 2022.

*Primary Examiner* — Topaz L. Elliott
(74) *Attorney, Agent, or Firm* — Carlson, Gaskey & Olds, P.C.

(57) ABSTRACT

A gas turbine engine has a low pressure turbine driving a fan rotor through a gear reduction gearbox. The low pressure turbine has an input shaft driving a sun gear. The sun gear drives intermediate gears. There is an output shaft driven by one of a carrier and a ring gear in the gear reduction to in turn drive a fan drive shaft to drive the fan. A bearing compartment housing encloses the gear reduction gearbox. A fan shaft bearing supports the fan drive shaft. An oil supply system delivers oil to at least one of the sun gear, the intermediate gears and the ring gear. A scavenge system returns oil from the bearing compartment housing to a sump. An ejector pump communicates with a source of pressurized fluid to assist in driving oil from within the bearing compartment housing into a scavenge tube.

6 Claims, 3 Drawing Sheets

(56) References Cited

U.S. PATENT DOCUMENTS

| | | | |
|---|---|---|---|
| 8,245,818 B2* | 8/2012 | Alecu | F01D 25/18 184/11.2 |
| 9,567,987 B2* | 2/2017 | Wang | F01D 25/183 |
| 9,790,856 B2 | 10/2017 | Trohel | |
| 11,162,420 B2* | 11/2021 | Logan | F02C 7/06 |
| 2006/0054408 A1* | 3/2006 | Swainson | F16H 57/0421 184/6.12 |
| 2009/0101444 A1* | 4/2009 | Alecu | F16N 39/04 184/11.2 |
| 2011/0314830 A1* | 12/2011 | Legare | F01D 25/20 60/39.08 |
| 2014/0248125 A1* | 9/2014 | Wang | F02C 7/06 415/110 |
| 2016/0298639 A1* | 10/2016 | Brault | F01D 25/18 |
| 2017/0089219 A1* | 3/2017 | Hasting | F02C 7/36 |
| 2019/0211875 A1* | 7/2019 | Morreale | F02C 7/00 |
| 2020/0109665 A1* | 4/2020 | Logan | F01D 25/20 |
| 2020/0141281 A1* | 5/2020 | Ikeguchi | F02C 7/00 |
| 2021/0047941 A1* | 2/2021 | Poulin | F16H 57/0408 |

* cited by examiner

GEARED GAS TURBINE WITH OIL SCAVENGE EJECTOR PUMP ASSIST

BACKGROUND OF THE INVENTION

This application relates to oil scavenging systems for a bearing compartment housing a gear reduction gearbox in a geared gas turbine engine.

Gas turbine engines are known, and typically include a fan delivering air into a bypass duct, as propulsion air, and into a core housing where it is delivered to a compressor. The air is compressed in the compressor, and delivered into a combustor where it is mixed with fuel and ignited. Products of this combustion pass downstream over turbine rotors, driving them to rotate. Turbine rotors in turn drive the fan and compressor rotors.

In one known engine type, a low pressure turbine drives a low pressure compressor and a high pressure turbine drives a high pressure compressor. The low pressure turbine also drives the fan. Historically the fan and low pressure turbine rotated at a common speed.

More recently a gear reduction gearbox has been placed between the fan and low pressure turbine such that fan can rotate at a slower speed. There are a number of efficiency advantages that flow from this arrangement. However, the gear reduction gearbox requires a complex lubrication system. A relatively high volume of lubricant is delivered to the gears within the gear reduction gearbox.

After the oil has lubricated gear interfaces it is scavenged and returned to an oil sump. In known geared gas turbine engines, the scavenge line is connected to a scavenge pump which returns the oil to the sump.

The gear reduction gearbox is mounted in a gear reduction bearing compartment. The bearing compartment has a bearing at each end of the gear reduction gearbox, and a seal outward of the bearing.

SUMMARY OF THE INVENTION

In a featured embodiment, a gas turbine engine includes a fan to deliver air into a bypass duct defined between an outer housing and a core housing as propulsion air. The fan further delivers air into the core housing where it communicates with a low pressure compressor, a high pressure compressor, a combustor, a high pressure turbine, and a low pressure turbine. The high pressure turbine drives the high pressure compressor and the low pressure turbine driving the low pressure compressor, and also drives the fan rotor through a gear reduction gearbox. The low pressure turbine has an input shaft driving a sun gear in the gear reduction gearbox. The sun gear drives intermediate gears. There is an output shaft driven by one of a carrier and a ring gear in the gear reduction to in turn drive a fan drive shaft to drive the fan. A bearing compartment housing encloses the gear reduction gearbox and has an inlet bearing supporting the inlet shaft from the low pressure turbine. A fan shaft bearing supports the fan drive shaft. An oil supply system communicates with a main oil pump. The oil supply system delivers oil to at least one of the sun gear, the intermediate gears and the ring gear. A scavenge system returns oil from the bearing compartment housing to a sump which communicates with the main oil pump. The scavenge system includes a scavenge tube. An ejector pump communicates with a source of pressurized fluid to assist in driving oil from within the bearing compartment housing into the scavenge tube.

In another embodiment according to the previous embodiment, a scavenge pump is positioned downstream of the scavenge tube, and downstream of the ejector pump.

In another embodiment according to any of the previous embodiments, a fan shaft seal is positioned outwardly of the fan shaft bearing and an input shaft seal is positioned outwardly of the input shaft bearing.

In another embodiment according to any of the previous embodiments, no vent hole is provided through the gear reduction bearing compartment housing.

In another embodiment according to any of the previous embodiments, the scavenge tube has an inlet communicating with an inner wall of the bearing compartment housing, and the ejector pump has an outlet downstream of the inlet to the scavenger tube.

In another embodiment according to any of the previous embodiments, the pressurized fluid is oil.

In another embodiment according to any of the previous embodiments, the pressurized fluid is tapped downstream of the main oil pump.

In another embodiment according to any of the previous embodiments, the scavenge tube has an inlet to communicate an inner wall of the bearing compartment housing, and the ejector pump has an outlet positioned upstream of the inlet to the scavenge tube.

In another embodiment according to any of the previous embodiments, wherein the pressurized fluid is air.

In another embodiment according to any of the previous embodiments, the pressurized air is tapped from one of the low pressure compressor and the high pressure compressor.

In another embodiment according to any of the previous embodiments, a fan shaft seal is positioned outwardly of the fan shaft bearing and an input shaft seal is positioned outwardly of the input shaft bearing.

In another embodiment according to any of the previous embodiments, the scavenge tube has an inlet communicating with an inner wall of the bearing compartment housing, and the ejector pump has an outlet downstream of the inlet to the scavenger tube.

In another embodiment according to any of the previous embodiments, the scavenge tube has an inlet to communicate an inner wall of the bearing compartment housing, and the ejector pump has an outlet positioned upstream of the inlet to the scavenge tube.

In another embodiment according to any of the previous embodiments, the pressurized fluid is oil.

In another embodiment according to any of the previous embodiments, the pressurized fluid is air.

In another embodiment according to any of the previous embodiments, the pressurized fluid is oil.

In another embodiment according to any of the previous embodiments, the pressurized fluid is tapped downstream of the main oil pump.

In another embodiment according to any of the previous embodiments, the pressurized fluid is air.

In another embodiment according to any of the previous embodiments, the scavenge tube has an inlet communicating with an inner wall of the bearing compartment housing, and the ejector pump has an outlet downstream of the inlet to the scavenger tube.

In another embodiment according to any of the previous embodiments, the scavenge tube has an inlet to communicate an inner wall of the bearing compartment housing, and the ejector pump has an outlet positioned upstream of the inlet to the scavenge tube.

The present disclosure may include any one or more of the individual features disclosed above and/or below alone or in any combination thereof.

These and other features of the present invention can be best understood from the following specification and drawings, the following of which is a brief description.

DETAILED DESCRIPTION

Figure 1:
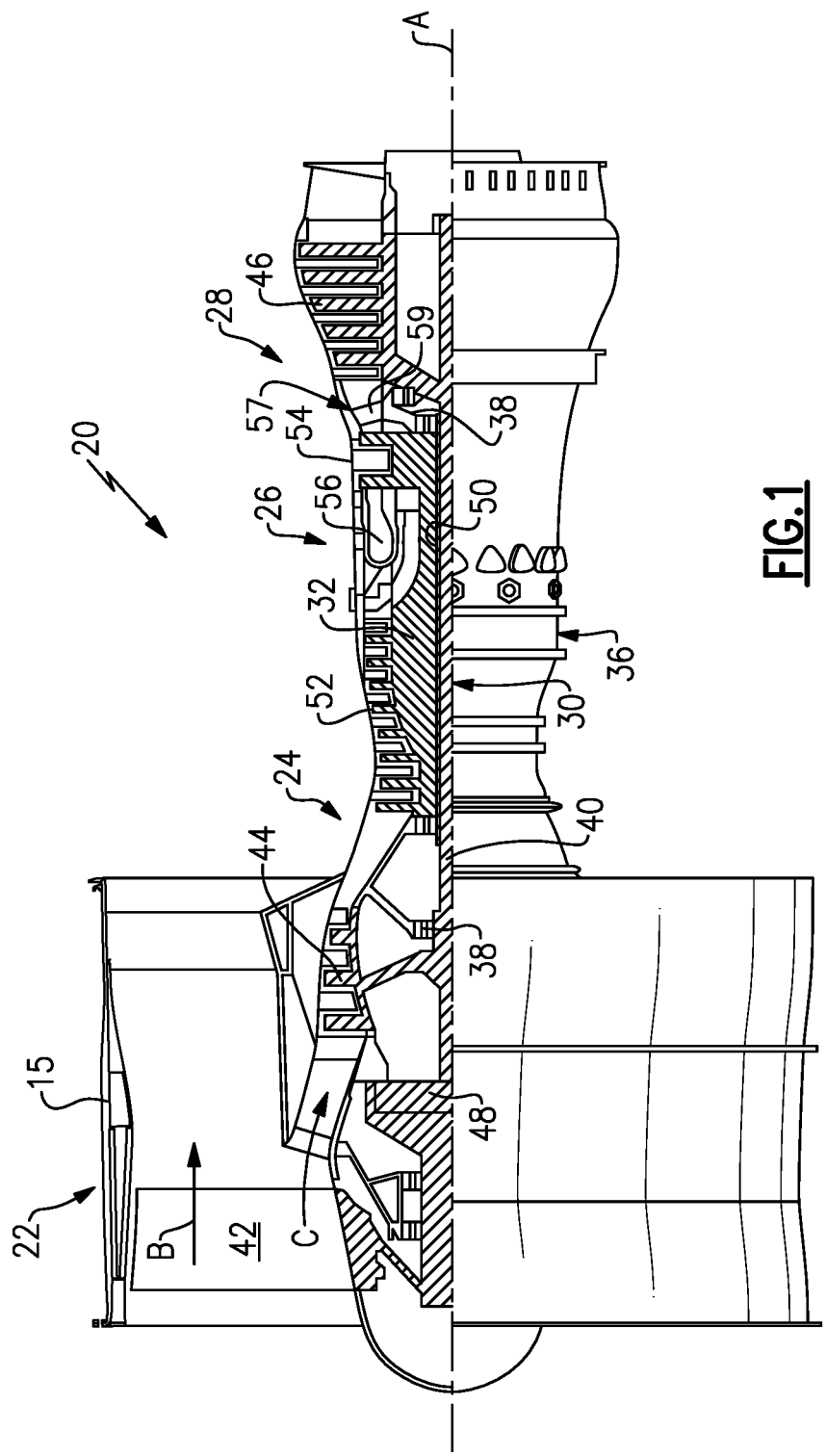
FIG. 1 schematically shows a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 drives air along a bypass flow path B in a bypass duct defined within a housing 15 such as a fan case or nacelle, and also drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive a fan 42 at a lower speed than the low speed spool 30. The high speed spool 32 includes an outer shaft 50 that interconnects a second (or high) pressure compressor 52 and a second (or high) pressure turbine 54. A combustor 56 is arranged in the exemplary gas turbine 20 between the high pressure compressor 52 and the high pressure turbine 54. A mid-turbine frame 57 of the engine static structure 36 may be arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded through the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of the low pressure compressor, or aft of the combustor section 26 or even aft of turbine section 28, and fan 42 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), and can be less than or equal to about 18.0, or more narrowly can be less than or equal to 16.0. The geared architecture 48 is an epicyclic gear train, such as a planetary gear system or other gear system, with a gear reduction ratio of greater than about 2.3. The gear reduction ratio may be less than or equal to 4.0. The low pressure turbine 46 has a pressure ratio that is greater than about five. The low pressure turbine pressure ratio can be less than or equal to 13.0, or more narrowly less than or equal to 12.0. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to an inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1 and less than about 5:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. The engine parameters described above and those in this paragraph are measured at this condition unless otherwise specified. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45, or more narrowly greater than or equal to 1.25. "Low corrected fan tip speed" is the actual fan tip speed in ft/sec divided by an industry standard temperature correction of $[(Tram\ °R)/(518.7°\ R)]^5$. The "Low corrected fan tip speed" as disclosed herein according to one non-limiting embodiment is less than about 1150.0 ft/second (350.5 meters/second), and can be greater than or equal to 1000.0 ft/second (304.8 meters/second).

Figure 2:
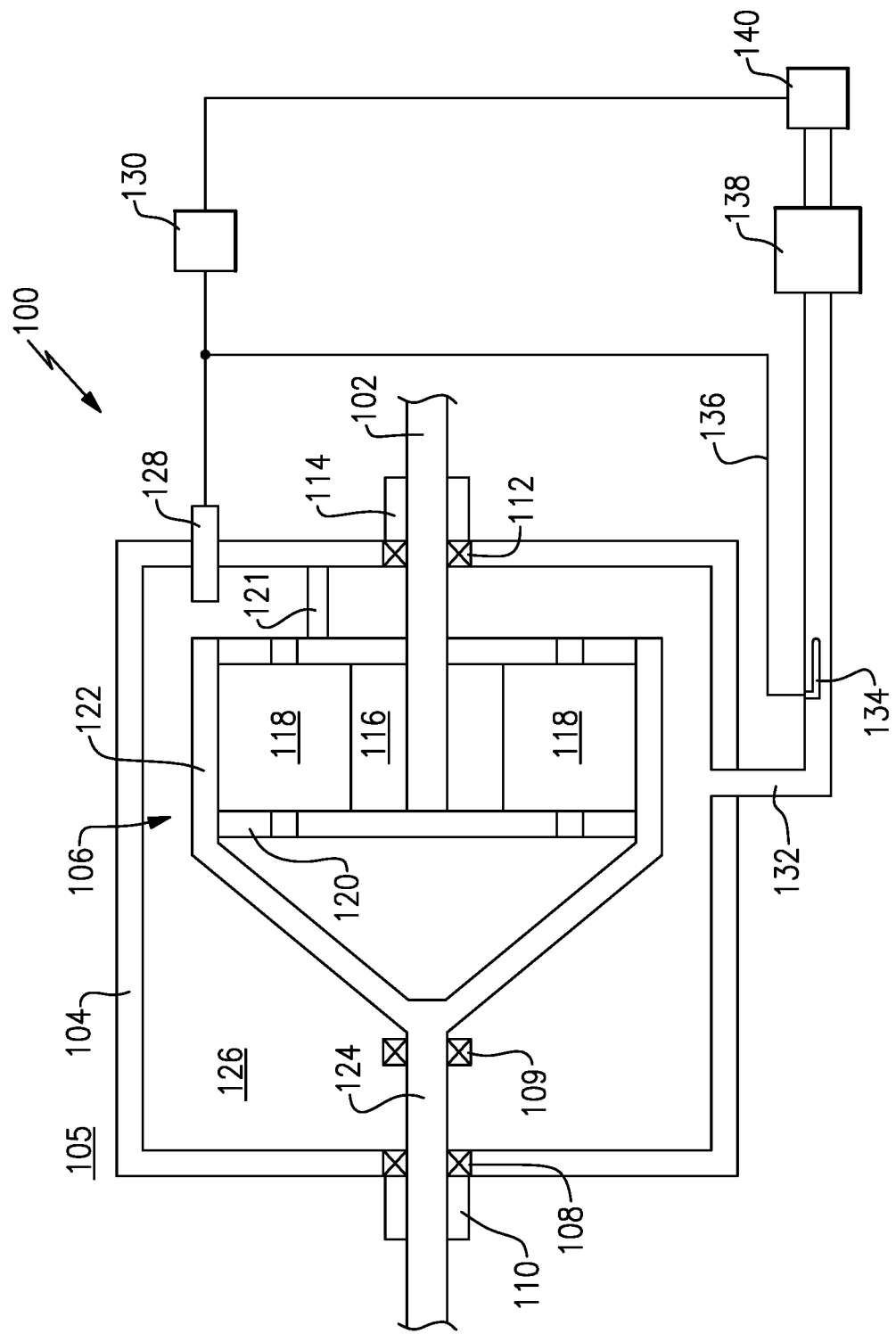
FIG. 2 shows a bearing compartment housing a gear reduction.

FIG. 2 shows a first embodiment 100 having an outer housing 104 enclosing a gear reduction gearbox 106.

An input shaft 102 is driven by a low pressure turbine (such as turbine 46 from FIG. 1), to in turn drive a sun gear 116. Sun gear 116 drives intermediate gears 118. Gears 118 drive a ring gear 122. The intermediate gears 118 are mounted in a carrier 120 which is schematically shown fixed at 121 to the housing 104. The ring gear 122 in turn drives a fan drive shaft 124 that goes to drive a fan (such as fan 42 from FIG. 1).

The arrangement as shown is a so called "star" epicyclic gear reduction. However, this disclosure would apply equally to a so called planetary epicyclic gear reduction. In a planetary system the ring gear 122 is fixed and the carrier 120 rotates to drive the shaft 124.

Bearings 108, 109 and 112 support the shafts 102 and 124 within the outer housing 104 and together serve to define the bearing compartment 126. Seals 110 and 114 are positioned outwardly of the bearings 108 and 112. Again, this is a schematic view. In practice bearings 108 and 112 may be inside the housing 104.

It should be understood that the bearing compartment, the gear reduction, the housing, the bearings and all of what is depicted in FIG. 2 is shown highly schematically.

Oil is supplied through an oil supply 128 from a main oil pump 130. In practice, the supply of oil to the gear reduction gearbox 106 is complex, and involves a number of components to accurately and efficiently deliver oil to gear interfaces which need lubrication. These features of this disclosure may be as known in the art. The main oil pump 130 communicates with an oil sump 140. An oil scavenge tube 132 scavenges oil delivered from supply 128 across the gear reduction gearbox 106 and bearing compartment 126.

In the past, the bearing compartment 126 has been maintained at a relatively high pressure. This pressure was deemed necessary to assist in driving the oil into the scavenge tube, and toward a scavenge pump. A vent to an outer chamber 105, which is at a relatively high pressure, was formed through the prior art housing to assist in driving the scavenge oil flow.

Applicant has recognized that this is somewhat undesirable. The higher pressure encourages leakage of lubricant across the seals 110 and 114. This has resulted in some concerns such as oil loss, with aircraft cabin odor issues.

In addition, there is significant windage or air drag due the prior art higher pressure in the bearing compartment 126 caused by the rotating components within the gear reduction 106. Thus, Applicant has recognized that lowering the pressure in the compartment 126 may be desirable.

To this end, an ejector pump 134 is positioned within the scavenge tube 132. The scavenge tube 132 communicates with a scavenge pump 138 which returns the oil to the sump 140. The ejector pump 134 is shown communicating downstream of the main oil pump 130 through a connection 136. Also, the prior art vent mentioned above may be eliminated.

The oil moved into connection 136 downstream of main oil pump 130 will be at a higher pressure than that found within the bearing compartment 126.

Now, when oil is delivered outwardly of the ejector pump 134 it draws oil from the interior of the bearing compartment 126 through the scavenge tube 132. This reduces the concerns mentioned above.

The position of the ejector pump 134 in FIG. 2 is shown schematically relative to a rotation axis of the gear reduction 106. In fact, FIGS. 3A and 3B better show the location.

Figure 3A:
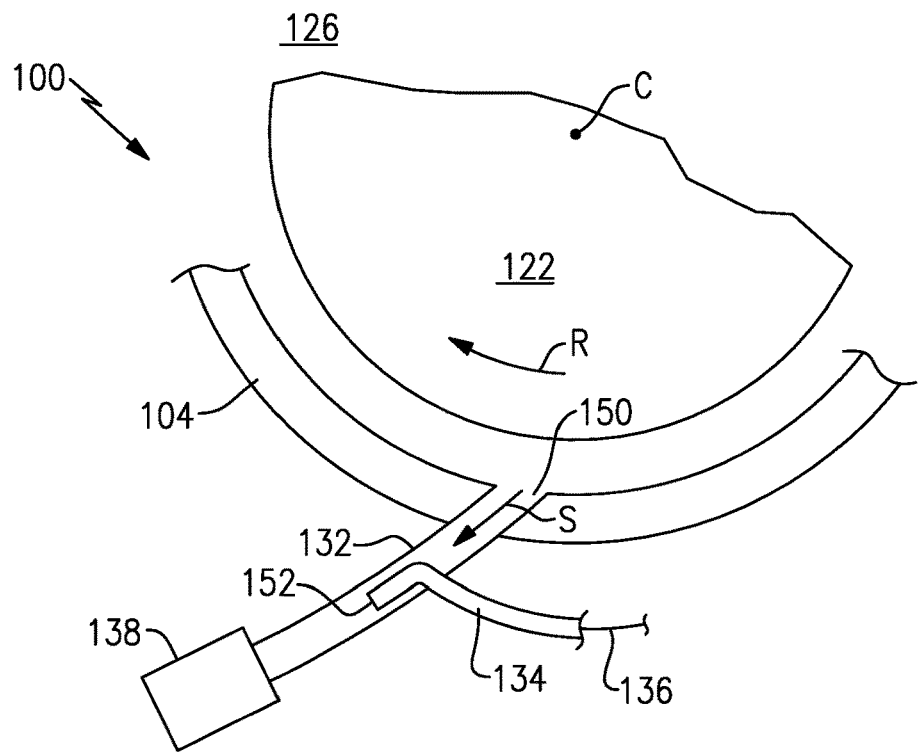
FIG. 3A shows a first embodiment oil scavenge system.

As shown in FIG. 3A, in the first embodiment 100, the ring gear 122 rotates in a direction R which is clockwise in this view. An opening 150 to scavenge tube 132 is shown to communicate oil outwardly of the housing 104 of the bearing compartment 126. A direction of oil flow S into the tube 132 has a circumferential component in the direction of rotation R. With a planetary gear system the direction S will have a component in a circumferential direction of the carrier. This direction gains assistance from the rotation to aid in guiding oil into the tube 132.

The ejector pump 134 communicates and delivers oil outwardly of an ejector outlet 152 which is downstream of the entrance 150, and within the scavenge tube 132.

Figure 3B:
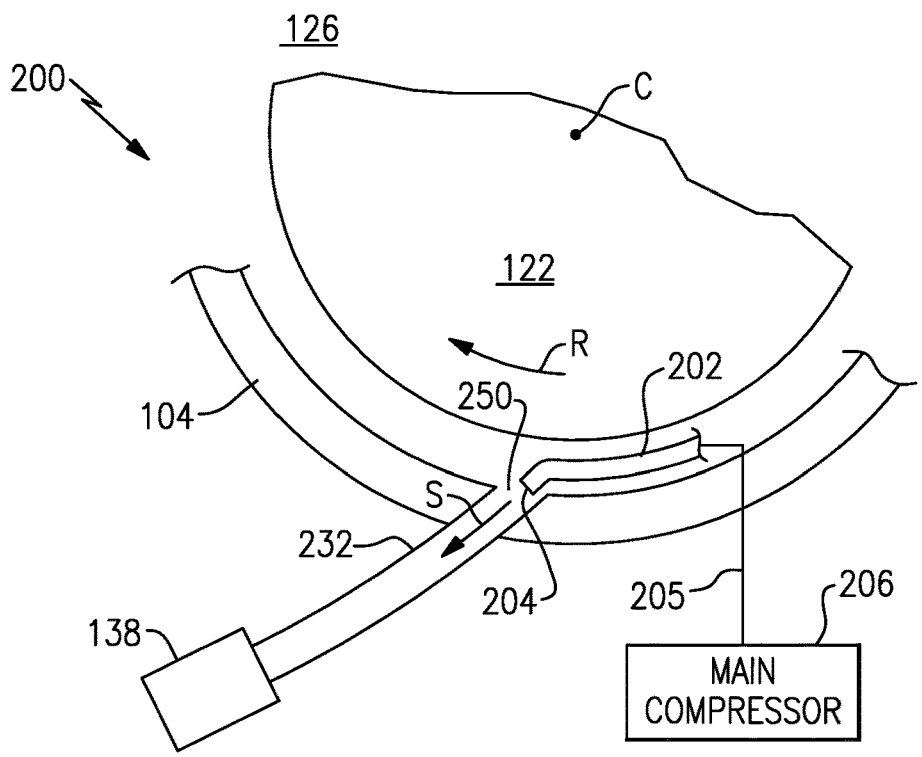
FIG. 3B shows a second embodiment oil scavenge system.

FIG. 3B shows an alternative embodiment 200 where the ejector pump 202 has its outlet 204 spaced outward of the ejector tube 232 and spaced closely from its entrance 250. In this embodiment, the ejector pump 202 communicates through a line 205 to a main compressor section 206 such that compressed air will drive the oil flow. Section 206 may be in the low or high pressure compressor such as shown in FIG. 1.

While air is shown as the driving fluid in FIG. 3B, and oil is shown as the driving fluid in FIG. 3A, either fluid, or some other fluid can be used with either arrangement.

Under this disclosure a gas turbine engine could be said to include a fan delivering air into a bypass duct defined between an outer housing and a core housing as propulsion air. The fan further delivers air into the core housing where it communicates with a low pressure compressor, a high pressure compressor, a combustor, a high pressure turbine, and a low pressure turbine.

The high pressure turbine drives the high pressure compressor. The low pressure turbine drives the low pressure compressor, and also the fan rotor through a gear reduction gearbox. The low pressure turbine has an input shaft driving a sun gear in the gear reduction gearbox. The sun gear drives intermediate gears, and there is an output shaft driven by one of a carrier and a ring gear in the gear reduction gearbox to in turn drive a fan drive shaft to drive the fan rotor.

A bearing compartment housing encloses the gear reduction gearbox and has an inlet bearing supporting the inlet shaft from the low pressure turbine. A fan shaft bearing supports the fan drive shaft. An oil supply system communicates with a main oil pump. The oil supply system delivers oil to at least one of the sun gear, the intermediate gears and the ring gear.

A scavenge system returns oil from the bearing compartment housing to a sump which communicates with the main oil pump. The scavenge system includes a scavenge tube. An ejector pump communicates with a source of pressurized fluid to assist in driving oil from within the bearing compartment housing into the scavenge tube.

Although embodiments of this disclosure have been shown, a worker of ordinary skill in this art would recognize that modifications would come within the scope of this disclosure. For that reason, the following claims should be studied to determine the true scope and content of this disclosure.

What is claimed is:

1. A gas turbine engine comprising:
a fan rotor to deliver propulsion air into a bypass duct defined between an outer housing and a core housing, and further to deliver core air into said core housing where the core air communicates with a low pressure compressor, a high pressure compressor, a combustor, a high pressure turbine, and a low pressure turbine, said high pressure turbine driving said high pressure compressor and said low pressure turbine driving said low pressure compressor, and also driving said fan rotor through a gear reduction gearbox;
said low pressure turbine having an input shaft driving a sun gear in said gear reduction gearbox, said sun gear driving intermediate gears, and there being an output shaft being driven by one of a carrier and a ring gear in said gear reduction to in turn drive a fan drive shaft to drive said fan;

a bearing compartment housing enclosing said gear reduction gearbox and having an input shaft bearing supporting said input shaft from said low pressure turbine, and a fan shaft bearing supporting said fan drive shaft;

an oil supply system communicating with a main oil pump, said oil supply system delivering oil to at least one of said sun gear, said intermediate gears, said carrier and said ring gear;

a scavenge system returning oil from said bearing compartment housing to a sump which communicates with said main oil pump, said scavenge system including a scavenge tube, and an ejector pump communicating with a source of pressurized fluid to assist in driving oil from within said bearing compartment housing into said scavenge tube; and wherein a scavenge pump is positioned downstream of said scavenge tube, and downstream of said ejector pump, and wherein a fan shaft seal is positioned outwardly of said fan shaft bearing and an input shaft seal is positioned outwardly of said input shaft bearing;

wherein said scavenge tube has an inlet communicating with an inner wall of said bearing compartment housing, and said ejector pump has an outlet downstream of said inlet to said scavenger tube; and wherein said pressurized fluid is oil.

2. The gas turbine engine as set forth in claim 1, wherein no vent hole is provided through said gear reduction bearing compartment housing.

3. The gas turbine engine as set forth in claim 1, wherein said pressurized fluid is tapped downstream of said main oil pump.

4. A gas turbine engine comprising:

a fan rotor to deliver propulsion air into a bypass duct defined between an outer housing and a core housing, and further to deliver core air into said core housing where the core air communicates with a low pressure compressor, a high pressure compressor, a combustor, a high pressure turbine, and a low pressure turbine, said high pressure turbine driving said high pressure compressor and said low pressure turbine driving said low pressure compressor, and also driving said fan rotor through a gear reduction gearbox;

said low pressure turbine having an input shaft driving a sun gear in said gear reduction gearbox, said sun gear driving intermediate gears, and there being an output shaft being driven by one of a carrier and a ring gear in said gear reduction to in turn drive a fan drive shaft to drive said fan;

a bearing compartment housing enclosing said gear reduction gearbox and having an input shaft bearing supporting said input shaft from said low pressure turbine, and a fan shaft bearing supporting said fan drive shaft;

an oil supply system communicating with a main oil pump, said oil supply system delivering oil to at least one of said sun gear, said intermediate gears, said carrier and said ring gear;

a scavenge system returning oil from said bearing compartment housing to a sump which communicates with said main oil pump, said scavenge system including a scavenge tube, and an ejector pump communicating with a source of pressurized fluid to assist in driving oil from within said bearing compartment housing into said scavenge tube; and wherein a scavenge pump is positioned downstream of said scavenge tube, and downstream of said ejector pump, and wherein a fan shaft seal is positioned outwardly of said fan shaft bearing and an input shaft seal is positioned outwardly of said input shaft bearing;

wherein said scavenge tube has an inlet communicating with an inner wall of said bearing compartment housing, and said ejector pump has an outlet downstream of said inlet to said scavenger tube; and wherein said pressurized fluid is pressurized air.

5. The gas turbine engine as set forth in claim 4, wherein said pressurized air is tapped from one of said low pressure compressor and said high pressure compressor.

6. The gas turbine engine as set forth in claim 4, wherein no vent hole is provided through said gear reduction bearing compartment housing.

* * * * *